United States Patent Office.

JAMES HENDERSON, OF BELLEFONTE, PENNSYLVANIA.

PROCESS OF ANNEALING CAST STEEL OR IRON.

SPECIFICATION forming part of Letters Patent No. 284,550, dated September 4, 1883.

Application filed March 2, 1883. (No specimens.)

*To all whom it may concern:*

Be it known that I, JAMES HENDERSON, of Bellefonte, in the county of Centre and State of Pennsylvania, (formerly of New York city,) have invented a new and useful Improvement in Processes of Annealing Cast Steel or Iron, of which the following is a full, clear, and exact description, as required by law.

The object of this invention is to anneal castings or other articles made of cast steel or iron by using oxygen and hydrogen for this purpose.

This my invention is based on the discovery that steel, when exposed to an oxidizing-flame which also contains the elementary constituents of water, either in the state of combination or dissociation, and when the steel is not covered or protected from the action of the flame, may be annealed by the action of said flame or some of its constituents.

In carrying out this my invention I prefer to use the apparatus described in my Letters Patent No. 283,484, August 21, 1883; and the preferred mode of producing the oxygen and hydrogen gases is to charge coal into the gas-producer of that apparatus, or into one similar to that described in the said previous application, the coal to be such as will produce at least one part, by volume, of hydrogen (more is of no disadvantage) to every three parts, by volume, of carbonic oxide produced by the admission of air at the tuyeres of the producer, and when the fuel does not produce this proportion of hydrogen, steam, preferably superheated, is introduced into the producer among the incandescent fuel, where by its decomposition into hydrogen and oxygen enough hydrogen is obtained, while the oxygen combines with its one equivalent of carbon and becomes carbonic oxide. The hydrogen thus supplied should be in the proportion of at least one-third of the volume of carbonic oxide produced by the joint action of the oxygen of the decomposed steam and the oxygen of the air blown in at the tuyere. The mixture of gases thus produced is mixed with the requisite quantity of air to produce complete combustion before its introduction to the metal-working chamber, a portion of said air or the oxygen of it combining with the hydrogen and producing vapor of water or its elementary constituents intensely heated, and another portion of said air combining with the carbonic oxide to form carbonic acid. The requisite quantity of air for this purpose may be applied by the means described in my previous patent, No. 283,484, August 21, 1883.

The steel to be treated is heated in the flame to a degree just below the point of fusion, or thereabout, care being taken to prevent the heating of the steel to the fusing-point, either by supplying a less quantity of the mixture of the gases than is sufficient to fuse the quantity of metal under treatment at one operation, or by the use of an excess of air over that required for complete combustion, or by supplying vapor of water to the flame in order to reduce the temperature below the point of fusion of the article under treatment. The highly-heated gases, impinging on the steel or iron, anneal it, the steel or iron being maintained at the said temperature and subjected to the action of said flame until the annealing is accomplished. The cast steel or iron to be thus treated may be cast-steel in the form of ingots, molded castings, or forgings, and may be the product of any process for producing cast-steel.

The metal to be treated, whether in the form of ingots, molded castings, or forgings, may be charged upon the hearth of the furnace or annealing-chamber in which it is to be subjected to the action of the flame hereinbefore described, the length of time of the exposure of the articles and the temperature of the flame being so regulated as not to produce fusion and to wholly or partially anneal it. The temperature should approach the fusing-point of the metal, and not exceed it, being, say, not higher than from 300° to 500° Fahrenheit below the point required to fuse the articles under treatment. The exposure of the metal should be approximately from half to three hours, according to the size and thickness of the article and the amount of annealing required. After the exposure of the articles in the furnace or chamber until they are annealed to the desired degree, the hearth containing them may be removed from the furnace, and the articles in their hot condition may be permitted to cool gradually by covering them while on the hearth with a suitable cover—such, for example, as a movable cover of brick-work or a covering of dry sand.

For the purposes of this invention, other combustible gases—such as illuminating-gas, or that derived from gas-wells or by the volatilization of hydrocarbons—which may contain the required proportions of hydrogen to carbon, and when mixed with air and used substantially as hereinbefore described—become the equivalents of the gaseous fuel hereinbefore described.

I wish it to be understood that I do not limit myself to any special form of gas-producer or furnace, as any form of apparatus in which the metal may be maintained at a temperature approaching fusion and subjected to the flame produced by the complete combustion of gaseous fuel containing the equivalents of at least one-third, by volume, of hydrogen to the carbonic oxide will answer the purpose.

I do not claim in the present application the purification of solid cast-iron and the production therefrom of wrought iron or steel by the use of a flame produced by the complete combustion of gaseous fuel containing carbon and hydrogen, as the treatment of solid cast-iron by these means forms the subject of my application for Patent No. 102,728, filed August 3, 1883, which is a division of this application.

I am aware of English Patent No. 3,840, A. D. 1874, wherein is described a process for annealing purified steel castings by subjecting them to the action of a flame produced by burning a mixture of gas and air, which is inoperative by reason of the proportions given of gas and air or oxygen—viz., "one to eight to fifteen"—being such as produce results the reverse of those intended, and impracticable from the difficulty of the production and excessive cost of the gas named—carbureted hydrogen or marsh-gas, ($C_2H_4$.) I therefore do not claim the use of marsh-gas or carbureted hydrogen ($C_2H_4$) when unmixed with other carbonaceous gases, nor the proportions of air or oxygen therein given to burn the said marsh-gas, as a part of this invention, or of being applicable thereto.

What I claim, and desire to secure by Letters Patent, is—

The process of annealing cast steel or iron, substantially as before described, which consists, first, in charging the metal (whether in the form of castings or after having been forged) into a suitable chamber; secondly, in providing a gaseous fuel containing carbon and hydrogen in the described proportions and mixing air therewith in quantity properly regulated to produce complete combustion and a homogeneous flame previous to its admission to said chamber, and, thirdly, in burning the mixture and causing the homogeneous flame thus produced to impinge upon the metal in said chamber and heat it to a temperature less than that required to produce fusion, thereby annealing the metal.

JAMES HENDERSON.

Witnesses:
JOSEPH J. SULLIVAN,
JOHN E. ELMENDORF.